United States Patent [19]

Arlauskas et al.

[11] 3,972,564

[45] Aug. 3, 1976

[54] INERTIA SEAT BACK LOCK

[75] Inventors: Alfonsas Arlauskas, Troy; Richard D. Loose, Birmingham, both of Mich.

[73] Assignee: General Motors Corporation, Detroit, Mich.

[22] Filed: Feb. 26, 1975

[21] Appl. No.: 553,298

[52] U.S. Cl. .............................. 297/378; 297/379
[51] Int. Cl.² .......................................... B60N 1/04
[58] Field of Search .................... 297/216, 378, 379

[56]        References Cited
            UNITED STATES PATENTS

| | | | |
|---|---|---|---|
| 2,732,003 | 1/1956 | Williams | 297/379 |
| 2,737,229 | 3/1956 | Semar | 297/379 |
| 2,873,794 | 2/1959 | Leslie et al. | 297/379 |
| 3,549,202 | 12/1970 | Boschen et al. | 297/379 |
| 3,628,831 | 12/1971 | Close | 297/379 |
| 3,635,525 | 1/1972 | Magyar | 297/379 X |
| 3,848,923 | 11/1974 | Dehler | 297/379 X |

Primary Examiner—Roy D. Frazier
Assistant Examiner—William E. Lyddane
Attorney, Agent, or Firm—Herbert Furman

[57] ABSTRACT

An inertia seat back lock includes first and second pivotally interconnected members respectively secured to a seat back and seat cushion to pivot the back to the cushion for forward tilting movement. The first member includes a pair of detent shoulders spaced circumferentially of each other relative to the seat back pivot to define respective first and second locked positions of the seat back. The first member has a first limit shoulder engageable with a stop on the second member to define the forward limit position of normal tilting movement of the seat back. An inertia member pivoted to the second member engages a stop on the second member under gravity bias to positively locate a latch shoulder thereof in a normal inoperative position out of the path of movement of the detent shoulders during normal tilting movement of the seat back. The center of gravity of the inertia member is below the pivot thereof. Inertia forces applied to the seat cushion are transferred to the inertia member to swing the inertia member to an operative position in the path of movement of the detent shoulders for engagement by one shoulder to lock the seat back in a respective locked position against tilting movement. The line of force between the engaged shoulders is normal to a line between the engaged shoulders and seat back pivot to bias the inertia member further toward the operative position and maintain the shoulders in engagement. A second limit shoulder of the first member engages the inertia member pivot to locate the seat back in upright position. A manually operable push button may be provided to swing the inertia member from the operative position to the inoperative position prior to full cessation of the inertia forces.

4 Claims, 9 Drawing Figures

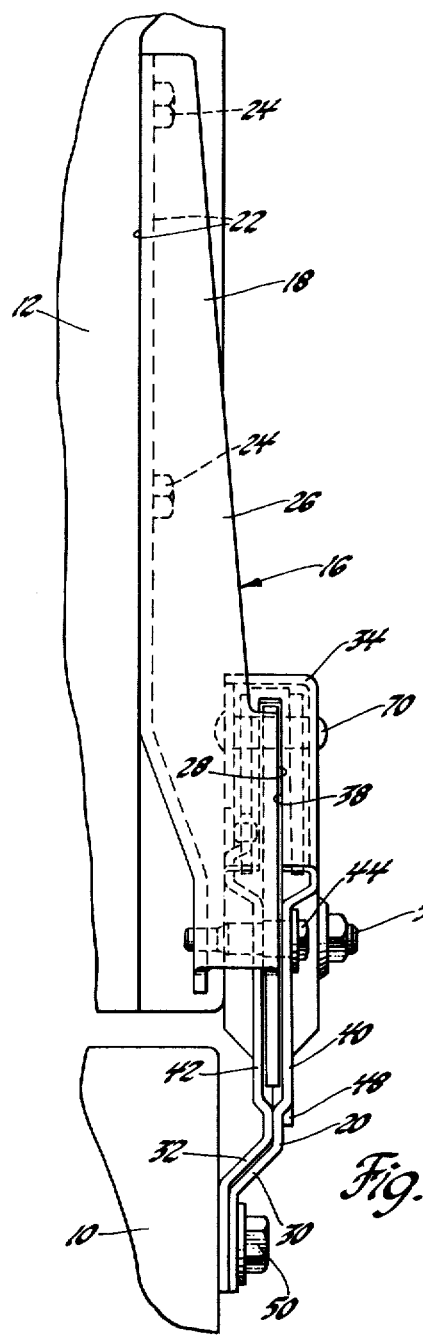
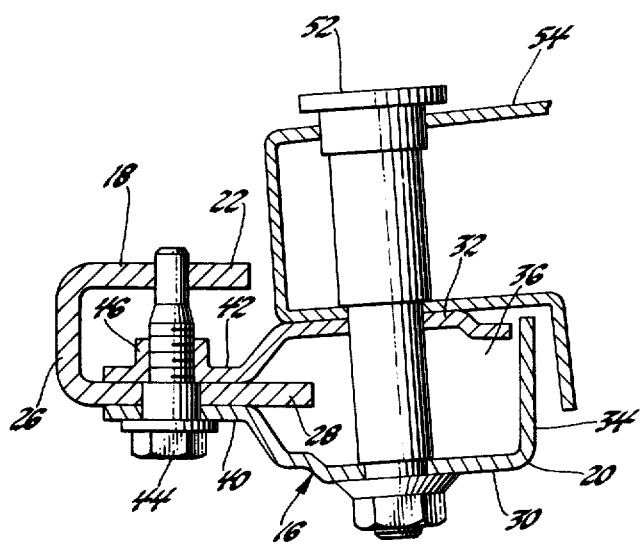
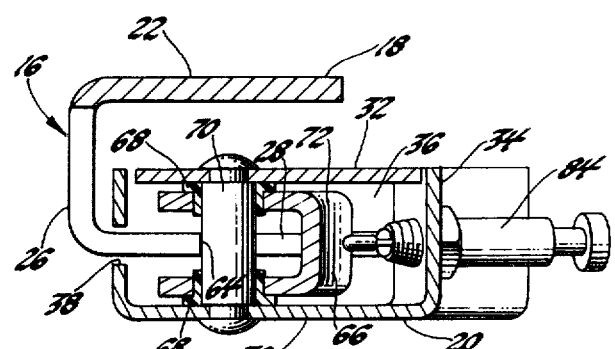
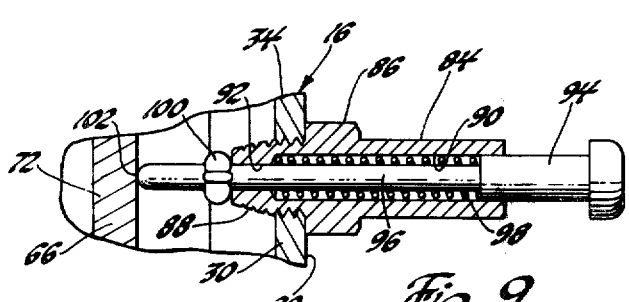
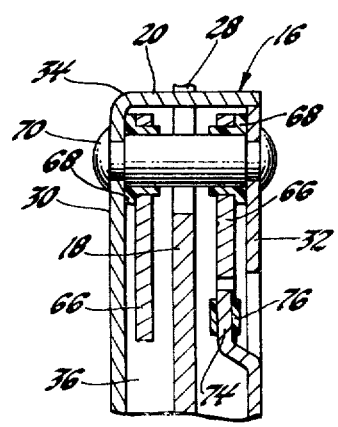

3,972,564

INERTIA SEAT BACK LOCK

This invention relates to inertia seat back locks and more particularly to an improved inertia seat back lock including a seat cushion mounted inertia actuated locking member which is normally positively located in an inoperative position and swingable under inertia forces to an operative position wherein a latch shoulder thereof is engageable with one of a plurality of detent shoulders of a seat back mounted member to limit tilting movement of the seat back relative to the seat cushion.

Inertia seat back locks are well known. Williams U.S. Pat. No. 2,732,003; Semar U.S. Pat. No. 2,737,229; and Leslie U.S. Pat. No. 2,873,794 show inertia seat back locks wherein a seat cushion mounted swingable inertia member is movable under inertia forces into engagement with a seat back mounted striker to limit forward tilting movement of the seat back relative to the seat cushion.

The seat back lock of this invention includes a number of features not found in such prior art seat back locks.

One feature is that the swingable inertia actuated locking member is gravity biased into engagement with a fixed stop to positively locate the locking member in a normal inoperative position. Another feature is that the locking member is supported on a first hinge member secured to the seat cushion and pivoted to a second hinge member secured to the seat back, with the pivot of the hinge members defining the pivot of the seat back relative to the seat cushion. A further feature is that the second hinge member includes first and second detent shoulders which are spaced circumferentially of each other relative to the seat back pivot for alternate engagement with a latch shoulder of the inertia member upon movement of the inertia member to an operative position under inertia forces applied thereto to thereby provide respective first and second locked positions of the seat back relative to the seat cushion. Yet another feature is that the line of force between the engaged latch and detent shoulders is normal to a line between the engaged shoulders and seat back pivot to bias the inertia member toward the operative position and maintain the shoulders in engagement. Still another feature is that the second hinge member includes first and second limit shoulders alternately engageable with a fixed stop on the first hinge member and the inertia member pivot to provide the limit positions of normal tilting movement of the seat back. Still a further feature is that a manual release may be optionally provided to move the inertia member from the operative position to the inoperative position prior to full cessation of the inertia forces applied thereto.

These and other features of the invention will be readily apparent from the following specification and drawings wherein FIG. 1 is a side elevational view of a conventional vehicle seat embodying a seat back locking according to this invention;

FIG. 5 is a view taken generally along the plane indicated by line 5—5 of FIG. 2;

FIG. 6 is an enlarged sectional view taken generally along the plane indicated by line 6—6 of FIG. 2;

FIG. 7 is an enlarged sectional view taken generally along the plane indicated by line 7—7 of FIG. 2;

FIG. 8 is an enlarged sectional view taken generally along the plane indicated by line 8—8 of FIG. 4; and FIG. 9 is an enlarged sectional view taken generally along the plane indicated by line 9—9 of FIG. 3.

Figure 1:
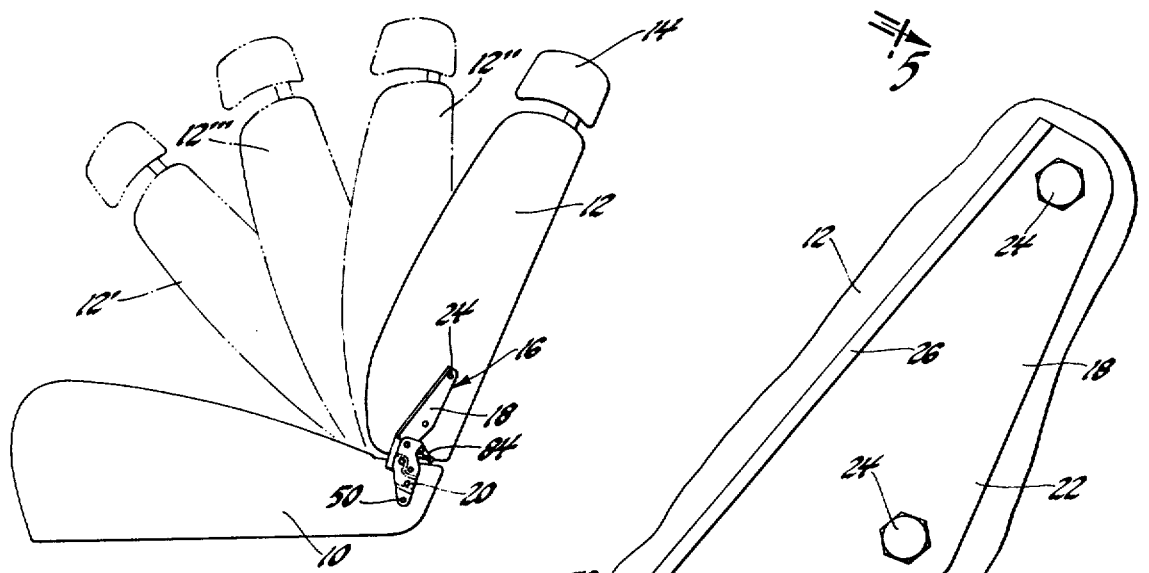

Referring now to FIG. 1 of the drawings, a conventional vehicle seat includes a seat cushion 10 and a seat back 12. The seat cushion 10 may be conventionally mounted on the floor pan of the vehicle by any known manual or power seat adjuster. Likewise, the seat back 12 may include a conventional headrest 14. A seat back lock 16 according to this invention provides the outboard pivot of the seat back 12 on the seat cushion 10 and cooperates with any conventional inboard pivot to mount the seat back on the seat cushion for forward tilting movement.

Figure 2:
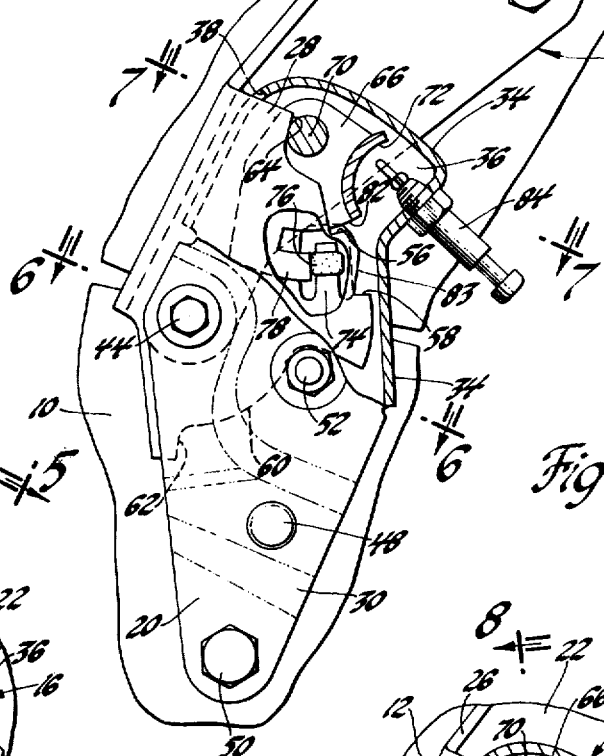
FIG. 2 is an enlarged partially broken away view of a portion of FIG. 1 and showing the locking member in a normal inoperative position permitting normal tilting movement of the seat back relative to the seat cushion.

Referring now to FIG. 2 of the drawings, the seat back lock includes a seat back mounted hinge member 18 and a seat cushion mounted member 20. The member 18 includes a base plate 22 which is bolted at 24 to the seat back frame, not shown. A lateral flange 26 of the member 18 terminates in a lateral flange 28 which is spaced from the plate 18 and generally parallel thereto.

The member 20 is comprised of outer and inner members 30 and 32 as best shown in FIGS. 5, 6 and 7. The outer member 30 includes a lateral flange 34 which generally surrounds the upper portion of the member 30 to define therewith an inertia locking member housing 36. The flange 34 is slotted at 38 to permit the flange 28 and member 18 to pivot relative to member 20 as will be described. The members 30 and 32 further include offset portions 40 and 42 respectively as shown in FIGS. 5 and 6 which provide a continuation of slot 38 and receive therebetween the flange 28 of the member 18. A bolt 44 extends through aligned apertures in the offset portions 40 and 42, in the flange 28, and in an offset portion of base plate 18, to pivotally interconnect members 18 and 20 and provide the outboard pivot of the seat back 12 on the seat 10. The bolt 44 is threaded into an integrally tapped flange 46 of the offset 42. The members 30 and 32 are riveted together at 48 and are bolted at 50 the seat cushion frame to mount member 20 thereto. A shoulder bolt 52, FIG. 6, extends through a portion 54 of the seat cushion frame and through the members 30 and 32 to additionally mount the member 20 to the seat cushion. Thus the members 18 and 20 pivotally mount the seat back 12 to the seat cushion 10 for forward tilting movement between a normal position 12 shown in full lines in FIG. 1 and a forwardly tilted position 12' shown in dash lines therein.

As shown in FIG. 2, the flange 28 includes a pair of detent shoulders 56 and 58 which are spaced circumferentially of each other with respect to the pivot of the seat back defined by the bolt 44. The flange 28 includes a cut-out 60 providing a stop shoulder 62 which defines the forwardly tilted terminal position 12' of the seat back upon engagement with the bolt 52. Another shoulder 64 defines the normal position 12 of the seat back as will be described. A stud 70 is shown in FIG. 2 in engagement with shoulder 64 to indicate the normal position 12 of the seat back, as shown in full lines in FIG. 1, and the alternate engagement of the bolt with the shoulder 62, not shown, would indicate the forwardly tilted position 12' of the seat back as shown in FIG. 1.

A generally U-shaped inertia locking member 66, FIGS. 2 and 7, is located between the members 30 and 32. The apertured legs of this member mount bushings 68 to space the inertia member with respect to the members 30 and 32 and to receive a headed over stud 70 which pivotally mounts the inertia member on the member 20 for free swinging movement relative thereto. Engagement of shoulder 64 with stud 70 defines the normal position 12 of the seat back. The legs of the inertia member are connected by a U-shaped bight 72 as best shown in FIG. 2. The center of gravity of the member 66 is below the pivot 70 thereof and is located so that the normal free position of the member 66 under gravity bias would be slightly counterclockwise of the position shown in FIG. 2. As shown in FIG. 8, the member 32 is provided with an integral lanced offset tab 74 which mounts a rubber sleeve or cushion 76. One of the legs of the member 66 is cut out to provide an extension 78 which abuts sleeve 76 to thereby locate the member 66 clockwise of its normal free position such that the gravity bias maintains the member 66 continuously in engagement with the sleeve 76 to thereby always positively locate the member 66 in its normal inoperative position. With reference to FIG. 2, when the inertia member 66 is in its normal inoperative position, it can be seen that the lower edge or locking shoulder 82 of bight 72 is out of the path of movement of the shoulders 56 and 58. Thus, upon normal manual tilting movement of the seat back 12 between its position 12 and 12' as shown in FIG. 1, the detent shoulders 56 and 58 will move past the latch shoulder 82 of the inertia member. This tilting movement, of course, is limited by the engagement of the bolt 52 with the shoulder 62 and pivot 70 with shoulder 64.

Figure 3:
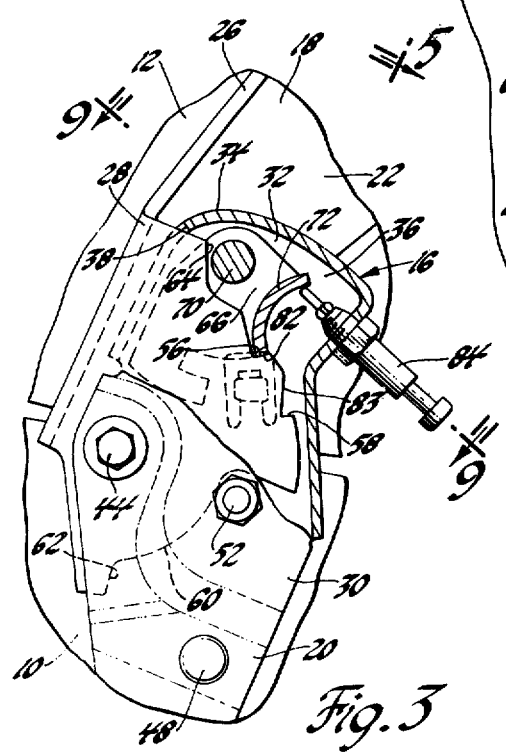
FIG. 3 is a partial view similar to FIG. 2 and showing the locking member in an operative position locking the seat back against forward tilting movement.

The inertia member 66 is arranged such that the amount of inertia force required to move this member from its normally inoperative position shown in FIG. 2 clockwise to its operative position shown in FIG. 3 is less than the inertia force required to move the seat back 12 from its normal position shown in FIG. 1 towards its forwardly tilted position 12' shown therein. In the specific structure shown herein, the member 66 will not move from its FIG. 2 position to its FIG. 3 position until it is subjected to a deceleration force of 0.32G while the seat back 12 will not move forwardly from its position 12 unless subjected to a deceleration force of 0.60G.

With reference now to FIGS. 2 and 3, and assuming that the seat back 12 is subjected to a deceleration force greater than that required to move it toward a forwardly tilted position, the inertia member 66 will, of course, move first since it requires less G force to move the inertia member than the seat back. The inertia member 66 will thus move from its FIG. 2 position to its FIG. 3 position to thereby locate the latch shoulder 82 in the path of movement of the shoulders 56 and 58. Subsequently, but of course within a few milliseconds, the seat back 12 will tilt forwardly so that the shoulder 56 will engage the latch shoulder 82 to thereby lock the seat back 12 in its position 12" against any further forward tilting movement.

It is possible under certain circumstances for the seat back 12 to be in a forwardly tilted position rather than in normal position when both the seat back and inertia member are subjected to the required G force. If such circumstances do occur, then it is possible for the detent shoulder 56 to be past the latch shoulder 82 when the required G force occurs. In this event the member 66 will still move from its FIG. 2 position to its FIG. 3 position, relative to the cam edge 83 between shoulders 56 and 58, and into engagement with the shoulder 58 to lock the seat back 12 in its position 12'" against any further tilting movement. By thus providing a plurality of detent shoulders, the seat back 12 will be locked in any one of a plurality of forwardly tilted positions short of a full forwardly tilted position when the seat back and seat cushion are subjected to deceleration forces above a predetermined level.

With reference to FIG. 3, when the latch shoulder 82 engages either detent shoulder 56 or 58, the line of force through such engagement is normal to a line between the pivot axis 44 of the seat back on the seat cushion and such point of engagement. This places the inertia member 66 in compression rather than in tension and also provides a resultant force biasing the inertia member 66 clockwise about the pivot 70 to tend to force the latch shoulder 82 further into engagement with either the detent shoulder 56 or 58.

From the foregoing description, it can be seen that the seat back lock of this invention permits normal manual tilting movement of the seat back relative to the seat cushion between a normal position and a forwardly tilted position with complete freedom. However, should the seat cushion and seat back be subjected to a deceleration force above a predetermined level, the inertia member 66 immediately moves clockwise toward an operative position wherein it will engage either the shoulder 56 or the shoulder 58 to thereby effectively lock the seat back 12 against further forward tilting movement. By positively locating the inertia member 66, there is no problem with the inertia member inadvertently engaging either shoulder 56 or 58 during normal tilting movement of the seat back and the relationship of the latch shoulder to the detent shoulders is always controlled.

Figure 4:
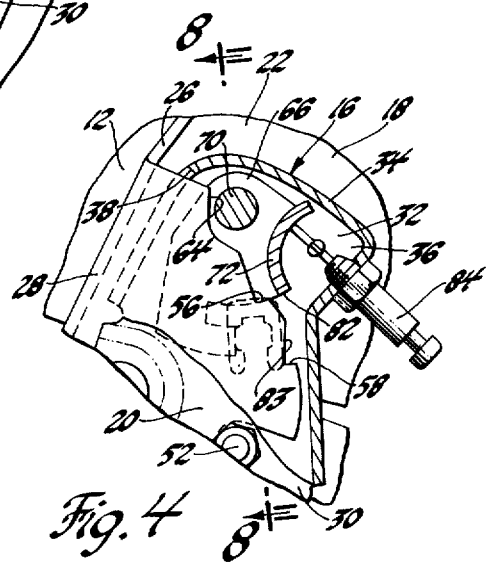
FIG. 4 is a view similar to FIG. 3 and showing the locking member being manually released prior to full cessation of inertia forces applied to the seat.

In certain installations, it may be desired to provide a manual release for the inertia member prior to full cessation of the deceleration forces applied thereto. Such a manual release 84 is shown in detail in FIG. 9 and Comprises a housing 86 having a tapered threaded end 88 which is threaded into an aperture in the flange 34 of member 30. The housing 86 includes a circular bore 90 and a smaller diameter bore 92 which receive a combined push button 94 and rod 96. A coil compression spring 98 fits between the push button 94 and the shoulder between bores 90 and 92 to bias the push button 94 and rod 96 outwardly relative to housing 86. The rod 96 is upset at 100 to provide a stop limiting such outward movement under the bias of spring 98 and locate the free end 102 of the rod in a predetermined spaced relationship to the bight 72 of the inertia member 66. When the inertia member is in its operative position as shown in FIGS. 3 and 9, the end 102 of the rod is immediately adjacent or engaging the bight 72. Manual pressure on the push button 94, once the inertia forces have decreased but not fully ceased, will pivot the inertia member 66 from its FIG. 3 position to its FIG. 4 position to thereby permit normal free movement of the seat back 12 relative to the seat cushion 10.

Thus this invention provides an improved inertia seat back lock.

We claim:

1. In combination with a vehicle seat including a seat cushion and a seat back, an inertia seat back lock comprising, in combination, first and second pivotally interconnected members respectively secured to the seat back and seat cushion to pivot the back to the cushion for tilting movement, the first member including a pair of detent shoulders spaced circumferentially of each other relative to the seat back pivot and defining respective first and second locked positions of the seat back, an inertia member including a latch shoulder, means pivotally mounting the inertia member on the second member with the center of gravity thereof below the inertia member pivot, stop means on the second member engageable by the inertia member under gravity bias to positively locate the inertia member in a normal inoperative position out of engagement with the first member with the latch shoulder thereof located out of the path of movement of both of the detent shoulders during normal tilting movement of the seat back, inertia forces applied to the seat cushion and inertia member pivoting the inertia member to an operative position wherein the latch shoulder thereof is in the path of movement of the detent shoulders for engagement by one detent shoulder to lock the seat back in a respective locked position, the resultant force between the engaged shoulders being normal to a line between such shoulders and the seat back pivot to place the inertia member in compression and bias the inertia member toward the operative position to maintain the shoulders in engagement.

2. In combination with a vehicle seat including a seat cushion and a seat back, an inertia seat back lock comprising, in combination, first and second pivotally interconnected members respectively secured to the seat back and seat cushion to pivot the back to the cushion for tilting movement, the first member including a pair of detent shoulders spaced circumferentially of each other relative to the seat back pivot and defining respective first and second locked positions of the seat back, the first member also including a pair of stop shoulders, a stop means on the second member engageable with one stop shoulder to set one terminal position of the seat back, an inertia member including a latch shoulder, means pivotally mounting the inertia member on the second member with the center of gravity thereof below the inertia member pivot, engagement of the other stop shoulder with the pivot means setting the other terminal position of the seat back, stop means on the second member engageable by the inertia member under gravity bias to positively locate the inertia member in a normal inoperative position out of engagement with the first member with the latch shoulder thereof located out of the path of movement of both of the detent shoulders during normal tilting movement of the seat back, inertia forces applied to the seat cushion and inertia member pivoting the inertia member to an inoperative position wherein the latch shoulder thereof is in the path of movement of the detent shoulders for engagement by one detent shoulder to lock the seat back in a respective locked position, the resultant force between the engaged shoulders being normal to a line between such shoulders and the seat back pivot to place the inertia member in compression and bias the inertia member toward the operative position to maintain the shoulders in engagement.

3. In combination with a vehicle seat including a seat cushion and a seat back, an inertia seat back lock comprising, in combination, first and second pivotally interconnected members respectively secured to the seat back and seat cushion to pivot the back to the cushion for tilting movement, the first member including a pair of detent shoulders spaced circumferentially of each other relative to the seat back pivot and defining respective first and second locked positions of the seat back, a generally U-shaped inertia member including a latch shoulder on the bight thereof, means pivotally mounting the legs of the inertia member on the second member with the center of gravity thereof below the inertia member pivot, stop means on the second member engageable by one leg of the inertia member under gravity bias to positively locate the inertia member in a normal inoperative position out of engagement with the first member with the latch shoulder thereof located out of the path of movement of both of the detent shoulders during normal tilting movement of the seat back, inertia forces applied to the seat cushion and inertia member pivoting the inertia member to an operative position wherein the latch shoulder thereof is in the path of movement of the detent shoulders for engagement by one detent shoulder to lock the seat back in a respective locked position, the resultant force between the engaged shoulders being normal to a line between such shoulders and the seat back pivot to place the inertia member in compression and bias the inertia member toward the operative position to maintain the shoulders in engagement.

4. In combination with a vehicle seat including a seat cushion and a seat back, an inertia seat back lock comprising, in combination, first and second pivotally interconnected members respectively secured to the seat back and seat cushion to pivot the back to the cushion for tilting movement, the second member including a housing with an opening thereto, the first member including a portion projecting within the housing through the opening thereof and having a pair of detent shoulders spaced circumferentially of each other relative to the seat back pivot to define first and second locked positions of the seat back, an inertia member including a latch shoulder, means pivotally mounting the inertia member within the housing with the center of gravity thereof below the inertia member pivot, stop means on the second member engageable by the inertia member under gravity bias to positively locate the inertia member in a normal inoperative position out of engagement with the first member with the latch shoulder thereof located out of the path of movement of both of the detent shoulders during normal tilting movement of the seat back, inertia forces applied to the seat cushion and inertia member pivoting the inertia member to an operative position wherein the latch shoulder thereof is in the path of movement of the detent shoulders for engagement by one detent shoulder to lock the seat back in a respective locked position, the resultant force between the engaged shoulders being normal to a line between such shoulders and the seat back pivot to place the inertia member in compression and bias the inertia member toward the operative position to maintain the shoulders in engagement.

* * * * *